(12) United States Patent
Iida et al.

(10) Patent No.: US 10,644,741 B2
(45) Date of Patent: May 5, 2020

(54) COMMUNICATION APPARATUS, DISTRIBUTED ANTENNA SYSTEM, AND SWITCHING METHOD

(71) Applicants: KABUSHIKI KAISHA TOSHIBA, Minato-ku (JP); Toshiba Infrastructure Systems & Solutions Corporation, Kawasaki-shi (JP)

(72) Inventors: Yasutaka Iida, Chofu (JP); Katsumi Kusama, Chofu (JP); Toshihiro Tango, Fuchu (JP); Naohiro Honda, Hino (JP)

(73) Assignees: KABUSHIKI KAISHA TOSHIBA, Minato-ku (JP); Toshiba Infrastructure Systems & Solutions Corporation, Kawasaki-shi (JP)

( * ) Notice: Subject to any disclaimer, the term of this patent is extended or adjusted under 35 U.S.C. 154(b) by 0 days.

(21) Appl. No.: 16/382,747

(22) Filed: Apr. 12, 2019

(65) Prior Publication Data
US 2019/0349019 A1    Nov. 14, 2019

(30) Foreign Application Priority Data
May 14, 2018    (JP) ................ 2018-093321

(51) Int. Cl.
*H04B 7/08*    (2006.01)
*H04B 17/00*    (2015.01)
(Continued)

(52) U.S. Cl.
CPC ........... *H04B 1/44* (2013.01); *H04L 27/2601* (2013.01); *H04B 7/04* (2013.01)

(58) Field of Classification Search
CPC ....... H04L 7/00; H04L 7/0079; H04L 7/0091; H04B 7/00; H04B 7/005; H04B 17/00;
(Continued)

(56) References Cited

U.S. PATENT DOCUMENTS

2009/0316611 A1    12/2009    Stratford et al.
2009/0318089 A1    12/2009    Stratford et al.
(Continued)

FOREIGN PATENT DOCUMENTS

JP    2011-525755    9/2011
JP    2011-525781    9/2011
(Continued)

*Primary Examiner* — Blane J Jackson
(74) *Attorney, Agent, or Firm* — Oblon, McClelland, Maier & Neustadt, L.L.P.

(57) ABSTRACT

According to an embodiment, a communication apparatus includes a switching unit, a reception unit, a rising edge detector, a symbol detector, and a switching timing detector. The switching unit switches a transmission operation of a signal in the communication apparatus between uplink signal transmission and downlink signal transmission. The reception unit receives a signal transmitted in a time division multiplexing scheme. The rising edge detector detects a rising edge of a received signal received by the reception unit. The symbol detector detects a symbol of a signal indicating a guard time in the time division multiplexing scheme from the received signal. The switching timing detector detects a switching timing of the transmission operation from the switching unit on the basis of detection results of the rising edge detector and the symbol detector.

17 Claims, 12 Drawing Sheets

(51) Int. Cl.
*H04L 7/00* (2006.01)
*H04B 1/44* (2006.01)
*H04L 27/26* (2006.01)
*H04B 7/04* (2017.01)

(58) Field of Classification Search
CPC ........ H04B 17/10; H04B 7/08; H04B 7/0802; H04B 7/06; H04B 7/0602; H04B 7/0413
See application file for complete search history.

(56) References Cited

U.S. PATENT DOCUMENTS

| | | | | |
|---|---|---|---|---|
| 2013/0107763 | A1* | 5/2013 | Uyehara | H04B 7/024 370/278 |
| 2017/0094679 | A1* | 3/2017 | Lupescu | H04L 5/1469 |
| 2019/0229798 | A1 | 7/2019 | Tango et al. | |
| 2019/0349019 | A1* | 11/2019 | Iida | H04B 7/0602 |

FOREIGN PATENT DOCUMENTS

| | | |
|---|---|---|
| JP | 5406924 | 2/2014 |
| JP | 5449344 | 3/2014 |
| JP | 2015-231144 | 12/2015 |
| JP | 2016-127384 | 7/2016 |
| JP | 2017-143349 | 8/2017 |
| JP | 2017-175398 | 9/2017 |
| JP | 2018-019142 | 2/2018 |
| WO | WO 2016/161438 A1 | 10/2016 |

* cited by examiner

| I VALUE OF SAMPLED SIGNAL | Q VALUE OF SAMPLED SIGNAL | I VALUE OF NOR-MALIZED SIGNAL | Q VALUE OF NOR-MALIZED SIGNAL |
|---|---|---|---|
| 1 | 1 | 0.707 | 0.707 |
| 1 | 2 | 0.447 | 0.894 |
| 1 | 3 | 0.316 | 0.949 |
| 2 | 1 | 0.894 | 0.447 |
| 2 | 2 | 0.707 | 0.707 |

| PHASE INFORMATION | I VALUE AFTER NORMALIZATION | Q VALUE AFTER NORMALIZATION |
|---|---|---|
| 2.000 | 0.894 | 0.447 |
| 1.000 | 0.707 | 0.707 |
| 0.667 | 0.555 | 0.832 |
| 0.500 | 0.447 | 0.894 |
| 0.333 | 0.316 | 0.949 |

T2

COMMUNICATION APPARATUS, DISTRIBUTED ANTENNA SYSTEM, AND SWITCHING METHOD

CROSS REFERENCE TO RELATED APPLICATION

This is application is based upon and claims the benefit of priority from Japanese Patent Application No. 2018-093321, filed on May 14, 2018; and the entire contents of which are incorporated herein by reference.

FIELD

Embodiments of the present invention relate to a communication apparatus, a distributed antenna system, and a switching method.

BACKGROUND

New transmission schemes for extending a transmission rate are required according to an increase in an amount of communication due to the widespread use of mobile communication terminals such as smart phones and tablets. As one of such schemes, a Long Term Evolution (LTE) time division duplex (TDD) scheme is adopted in addition to a conventional LTE frequency division duplex (FDD) scheme. The FDD scheme is a duplex scheme in which frequency bands for use in an uplink (hereinafter referred to as "UL") and a downlink (hereinafter referred to as "DL") are provided separately. The FDD scheme is a scheme in which a transmission rate is increased by independently performing UL and DL transmissions. However, because frequency resources are finite, it is difficult to newly allocate a broadband for the FDD scheme. Thus, an LTE TDD scheme of dividing UL and DL with respect to time by using the same frequency band is beginning to be adopted. Because the TDD scheme requires half a band as compared with the FDD scheme, it is possible to effectively utilize frequency resources therewith.

On the other hand, as one method of transmitting radio waves transmitted from a wireless device such as a mobile phone base station to a plurality of dead zones which radio waves do not reach, a distributed antenna system (DAS) for drawing a slave station for a base station in each dead zone in a wired manner is provided. The DAS can not only eliminate the dead zone but also can reduce an installation space for a base station. Thus, DASs are being actively used in zones which radio waves do not reach such as the inside of buildings, underground malls, and tunnels.

Here, if the LTE TDD scheme is applied to the DAS, it is necessary to perform switching of transmission/reception using UL and DL. If there is a deviation between a switching timing of the transmission/reception of the DAS and a switching timing of the LTE TDD scheme, UL and DL interfere with each other and communication quality deteriorates. Due to this mutual interference, the transmission/reception of a control signal between a base station and a user terminal is obstructed, so that communication of the user terminal is disabled. Thus, in the LTE TDD scheme, a guard time is provided between UL and DL in order to prevent mutual interference between UL and DL. Mutual interference between UL and DL can be prevented by performing switching of the transmission/reception of the DAS during this guard time.

In order to perform switching of the transmission/reception of a DAS during the guard time, it is necessary to detect the beginning of an UL signal or a DL signal. If the beginning of a signal can be accurately detected, it is possible to perform transmission without affecting the communication quality even if the signal has a short guard time. Conventionally, the beginning of the UL signal or the DL signal is detected based on a switching timing between UL and DL estimated on the basis of configuration information in the LTE TDD scheme. However because it is necessary to decode a received radio signal to acquire the configuration information in the LTE TDD scheme, an apparatus constituting the DAS becomes complicated.

Also, as another detection method, the beginning of the UL signal is detected by estimating a radio signal of a user terminal connected to a macro base station that can be an interference source on the basis of an output of a detector. However, because the output of the detector generally has a variation of about several microseconds, it is difficult to detect the beginning of the signal with high accuracy. As described above, it has conventionally been difficult to detect the beginning of the UL signal or the DL signal with a simple configuration and high accuracy.

DETAILED DESCRIPTION

Hereinafter, a communication apparatus, a distributed antenna system, and a switching method of embodiments will be described with reference to the drawings.

First Embodiment

Figure 1:
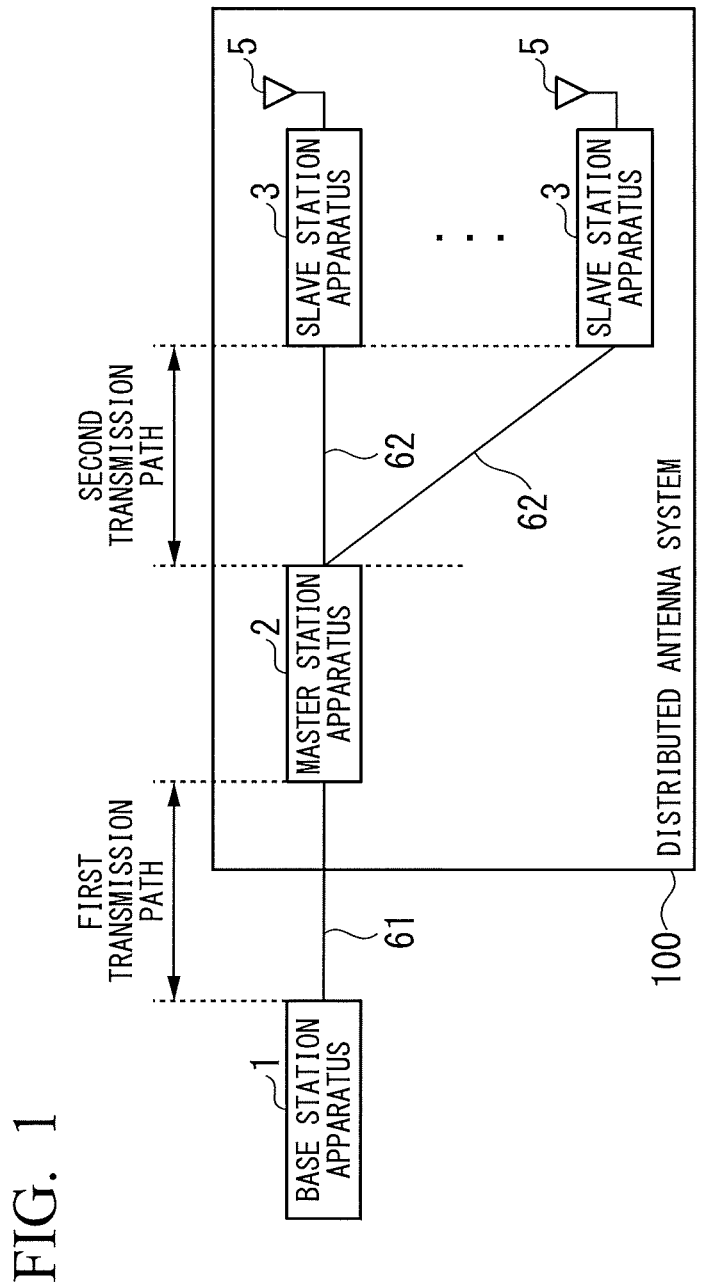
FIG. 1 is a diagram illustrating a specific example of a system configuration of a distributed antenna system according to a first embodiment.
Figure 2:
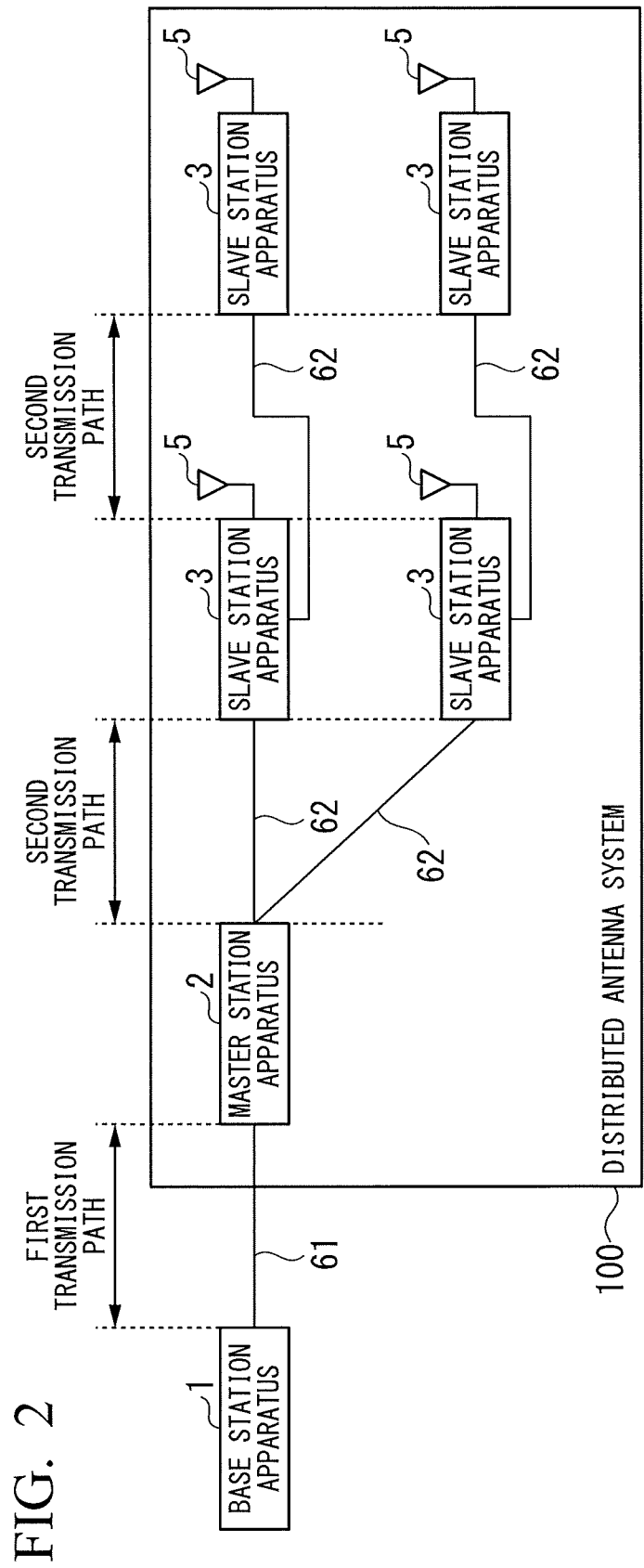
FIG. 2 is a diagram illustrating a specific example of the system configuration of the distributed antenna system according to the first embodiment.
Figure 3:
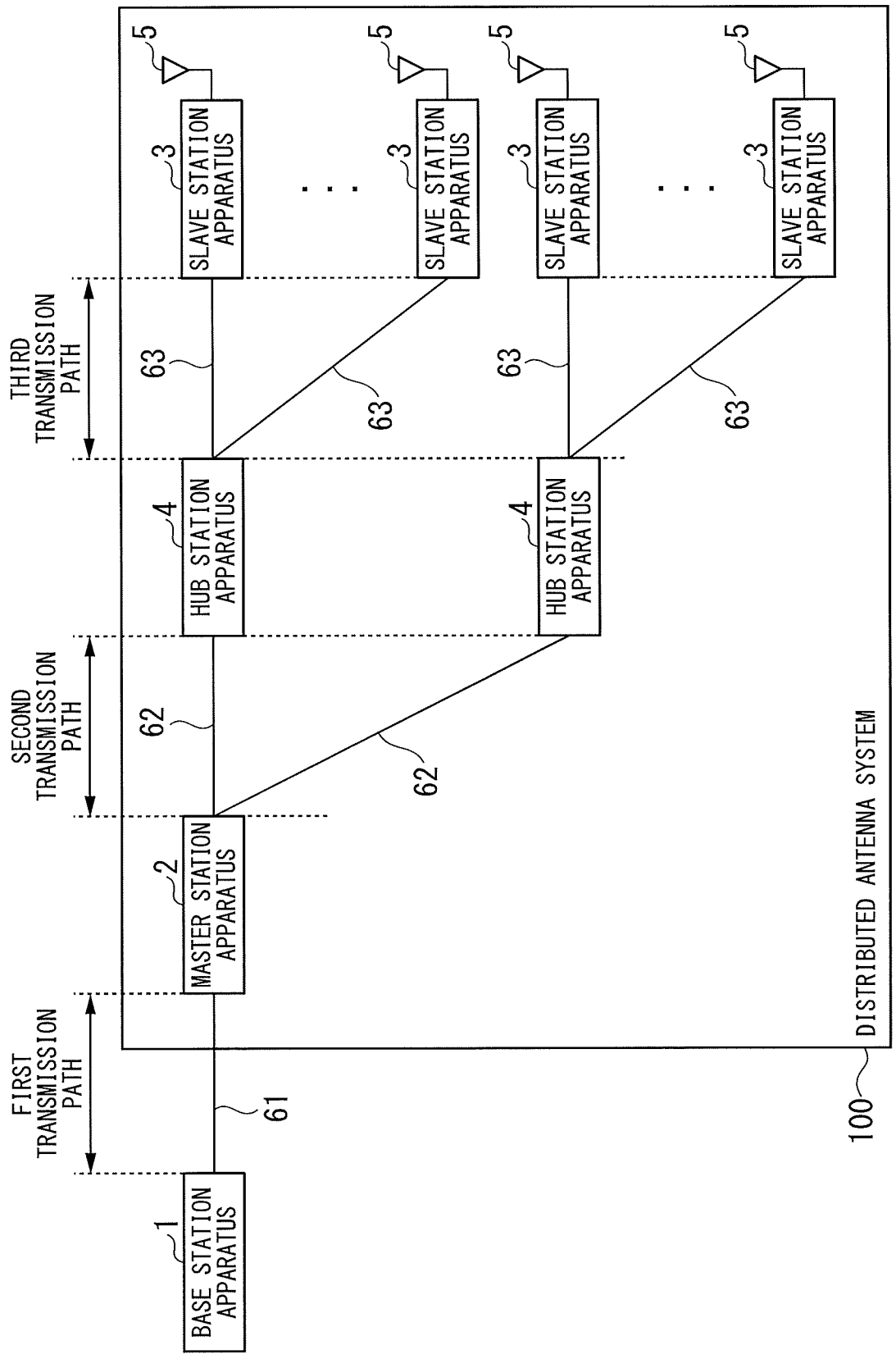
FIG. 3 is a diagram illustrating a specific example of the system configuration of the distributed antenna system according to the first embodiment.

FIGS. 1 to 3 are diagrams illustrating specific examples of a system configuration of a distributed antenna system according to a first embodiment. The distributed antenna system according to the first embodiment includes one master station apparatus 2 connected to a base station apparatus 1 and a plurality of slave station apparatuses 3 directly or indirectly connected to the master station apparatus 2. FIG. 1 illustrates an example in which the plurality of slave station apparatuses 3 are directly connected to the master station apparatus 2. FIG. 2 illustrates an example in which some of the plurality of slave station apparatuses 3 are directly connected to the master station apparatus 2 and the other slave station apparatuses 3 are indirectly connected to the master station apparatus 2 via the directly connected slave station apparatuses 3. FIG. 3 illustrates an example in which the plurality of slave station apparatuses 3 are connected to the master station apparatus 2 via one or more hub station apparatuses 4. Each of the plurality of slave station apparatuses 3 includes an antenna 5 for wirelessly communicating with a user terminal (not illustrated).

Each of the distributed antenna systems 100 illustrated in FIGS. 1 to 3 includes a transmission path 61 for connecting any base station apparatus 1 and the master station apparatus 2 and two transmission paths 62 and 63 for connecting the plurality of slave station apparatuses 3 and the master station apparatus 2. Hereinafter, the transmission path 61 may be referred to as a first transmission path, the transmission path 62 may be referred to as a second transmission path, and the transmission path 63 may be referred to as a third transmission path. Also, when the slave station apparatus 3 is directly or indirectly connected to the master station apparatus 2, the number of slave station apparatuses 3 or the number of hub station apparatuses 4 or connection relationships between the master station apparatus 2, the slave station apparatuses 3, and the hub station apparatuses 4 may be different from those in FIGS. 1 to 3. Hereinafter, the configuration of the distributed antenna system 100 having the configuration illustrated in FIG. 3 will be described.

Figure 4:
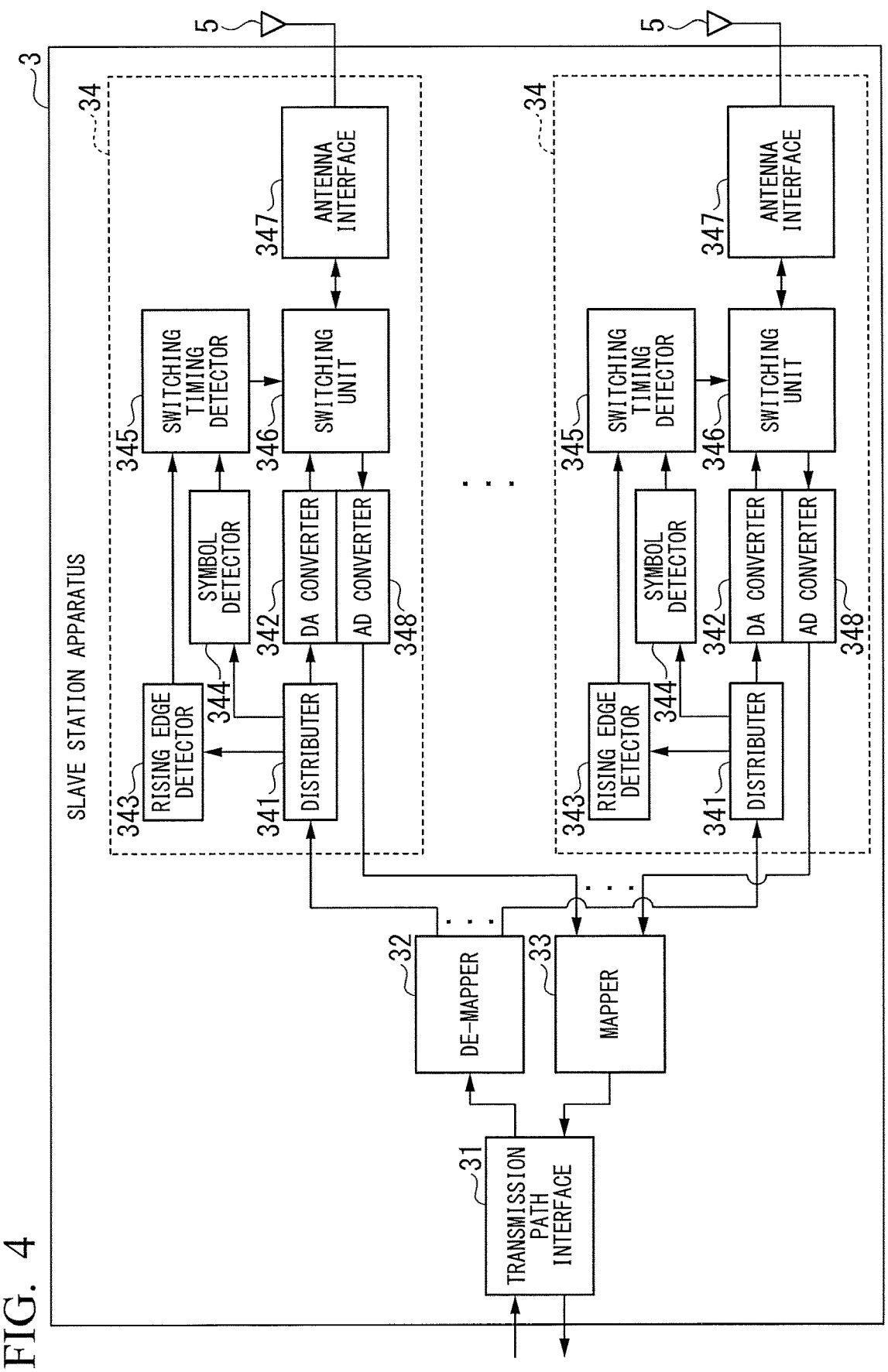
FIG. 4 is a diagram illustrating a specific example of a functional configuration of a slave station apparatus 3 of the first embodiment.

FIG. 4 is a block diagram illustrating a specific example of a functional configuration of the slave station apparatus 3 of the first embodiment. The slave station apparatus 3 includes a central processing unit (CPU), a memory, an auxiliary storage apparatus, and the like connected through a bus and executes a program. The slave station apparatus 3 functions as an apparatus including a transmission path interface 31, a de-mapper 32, a mapper 33, and one or more transmission units 34 by executing a program. Also, all or some of functions of the slave station apparatus 3 may be implemented using hardware such as an application specific integrated circuit (ASIC), a programmable logic device (PLD), or a field programmable gate array (FPGA). The program may be recorded on a computer-readable recording medium. Also, the computer-readable recording medium is a storage apparatus such as a flexible disk, a magneto-optical disc, a read only memory (ROM), a portable medium such as a compact disc (CD)-ROM, or a hard disk embedded in a computer system. The program may be transmitted via an electrical communication circuit.

The transmission path interface 31 receives a signal transmitted from the base station apparatus 1 and transmits a signal addressed to the base station apparatus 1. Signals to be transmitted and received between the slave station apparatus 3 and the base station apparatus 1 are transmitted in a frame format. In other words, a signal to be transmitted and received between the transmission path interface 31 and the base station apparatus 1 is a digital signal. Hereinafter, a direction of communication from the base station apparatus 1 to a user terminal is referred to as a "downlink (DL)" and a direction of communication from the user terminal to the base station apparatus 1 is referred to as an "uplink (UL)". Also, a signal to be transmitted in the downlink direction is referred to as a "DL signal" and a signal to be transmitted in the uplink direction is referred to as a "UL signal". A DL signal transmitted from the base station apparatus 1 is transmitted to the user terminal via the first transmission path 61, the master station apparatus 2, the second transmission path 62, the hub station apparatus 4, the third transmission path 63, the slave station apparatus 3 in order. Also, an UL signal transmitted from the user terminal is transmitted to the base station apparatus 1 via the slave station apparatus 3, the third transmission path 63, the hub station apparatus 4, the second transmission path 62, the master station apparatus 2, and the first transmission path 61 in this order.

The transmission path interface 31 is connected to the communication interface of the base station apparatus 1 in a wired manner. The transmission path interface 31 outputs a received DL signal to the de-mapper 32 and transmits an UL signal output from the mapper 33 to the base station apparatus 1.

The de-mapper 32 performs a de-mapping process on a frame for transmitting a DL signal (hereinafter referred to as a "DL frame"). According to such a de-mapping process, the de-mapper 32 acquires the DL signal stored in the DL frame and outputs the acquired DL signal to each transmission unit 34 as a continuous digital signal in the order of reception.

The mapper 33 performs a mapping process on the UL signal output from each transmission unit 34. The UL signal output from each transmission unit 34 is a continuous digital signal. According to such a mapping process, the mapper 33 generates a frame for transmitting the UL signal (hereinafter referred to as a "UL frame"). Specifically, the UL signal output from each transmission unit 34 is an orthogonal frequency division multiplexing (OFDM) signal to which a cyclic prefix (CP) is added as a guard time between symbols.

For example, the OFDM signal is a signal transmitted through LTE, a wireless local area network (LAN), or the like. The mapper 33 generates an UL frame into which UL signals output from the transmission units 34 are multiplexed. The mapper 33 outputs the generated UL frame to the transmission path interface 31.

Each transmission unit 34 includes an antenna 5 configured to communicate with a user terminal, transmits a DL signal between the de-mapper 32 and the antenna 5 in the downlink direction, and transmits an UL signal between the mapper 33 and the antenna 5 in the uplink direction. Each transmission unit 34 performs signal transmission while alternately performing switching between the UL signal transmission and the DL signal transmission. Here, each transmission unit 34 has the following configuration, thereby detecting a timing of the switching between the UL signal transmission and the DL signal transmission on the basis of a reception situation of the DL signal transmitted from the base station apparatus 1.

Each transmission unit 34 includes a distributer 34L a digital-to-analog (DA) converter 342, a rising edge detector 343, a symbol detector 344, a switching timing detector 345, a switching unit 346, an antenna interface 347, and an analog-to-digital (AD) converter 348.

The distributer 341 has a function of distributing an input signal to the DA converter 342 and the rising edge detector 343. According to this function, the DL signal output by the de-mapper 32 is distributed to the DA converter 342 and the symbol detector 344. Here, the DL signal output from the de-mapper 32 is a digital signal.

The DA converter 342 converts the DL signal output by the distributer 341 from a digital signal into an analog signal. Specifically, the DA converter 342 converts the DL signal into an analog signal of a wireless communication hand (hereinafter referred to as a "radio signal"). The DA converter 342 outputs the DL signal converted into the radio signal to the switching unit 346.

The rising edge detector 343 inputs an output signal of the distributer 341. The rising edge detector 343 detects a start of the output of the DL signal by detecting a rising edge of the input signal. Specifically, the rising edge detector 343 has a function of measuring reception power of the input signal and detects a rising edge of the reception power. For example, the rising edge detector 343 is a digital detector. When the start of the output of the DL signal is detected, the rising edge detector 343 outputs a signal for providing a notification of the detection (hereinafter referred to as a "rising edge detection signal") to the switching timing detector 345.

The symbol detector 344 detects a symbol of the DL signal distributed by the distributer 341. The symbol detector 344 calculates a correlation value between symbol signals detected at different timings. The symbol detector 344 outputs a signal indicating the calculated correlation value (hereinafter referred to as a "correlation value signal") to the switching timing detector 345.

The switching timing detector 345 detects a timing at which the UL signal transmission is switched to the DL signal transmission on the basis of the rising edge detection signal output by the rising edge detector 343 and the correlation value signal output by the symbol detector 344. The switching timing detector 345 outputs a signal for providing a notification of the detected switching timing (hereinafter referred to as a "timing signal") to the switching unit 346.

The switching unit 346 has a function of inputting/outputting the UL signal and the DL signal. The switching unit 346 alternately performs switching between the input/output of the UL signal and the input/output of the DL signal. Specifically, when the input/output of the DL signal is completed, the switching unit 346 switches its own input/output operation to the input/output of the UL signal. Also, the switching unit 346 switches its own input/output operation from the input/output of the UL signal to the input/output of the DL signal on the basis of a timing signal output by the switching timing detector 345. The switching unit 346 outputs the UL signal output from the antenna interface 347 to the AD converter 348 when the input/output operation of the UL signal is performed and outputs the DL signal output from the DA converter 342 to the antenna interface 347 when the input/output operation of the DL signal is performed.

The antenna interface 347 is connected to the antenna 5, outputs a radio signal received via the antenna 5 as an UL signal to the switching unit 346, and wirelessly transmits a DL signal output from the switching unit 346 via the antenna 5. Here, the UL signal output from the antenna interface 347 to the switching unit 346 is an analog signal.

The AD converter 348 converts the UL signal output from the switching unit 346 into a digital signal. The AD converter 348 outputs the UL signal converted into the digital signal to the mapper 33.

Figure 5:
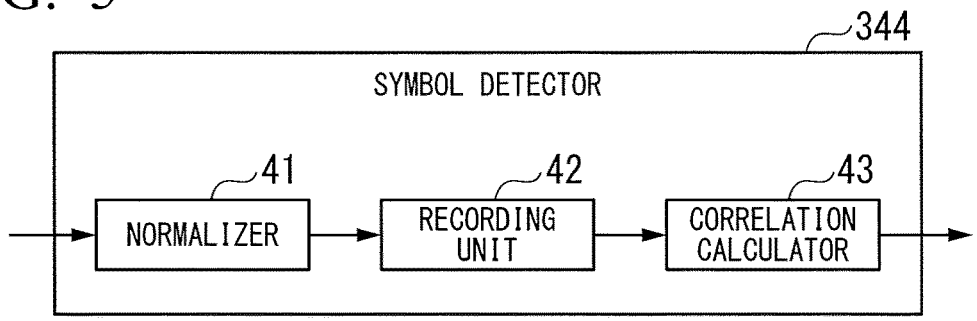
FIG. 5 is a diagram illustrating a specific example of a functional configuration of a symbol detector 344 according to the first embodiment.

FIG. 5 is a block diagram illustrating a specific example of a functional configuration of the symbol detector 344 according to the first embodiment. The symbol detector 344 includes a normalizer 41, a recording unit 42, and a correlation calculator 43.

The normalizer 41 normalizes the DL signal converted into the analog signal output from the DA converter 342. The normalization described here indicates the conversion of the DL signal into an OFDM signal having an amplitude of 1 by dividing each component of the DL signal which is the OFDM signal by the amplitude thereof. The normalizer 41 outputs the normalized DL signal (hereinafter referred to as a "normalized signal") to the recording unit 42.

The recording unit 42 includes a storage apparatus such as a magnetic hard disk apparatus or a semiconductor storage apparatus and records the normalized signal output by the normalizer 41 in the storage apparatus. Specifically, the recording unit 42 samples a prescribed number of normalized signals that are analog signals and records the sampled normalized signals (hereinafter referred to as "sampled signals").

The correlation calculator 43 reads a plurality of sampled signals from the recording unit 42 and calculates a correlation value between the read sampled signals. For example, the correlation value is obtained by performing a product-sum operation, convolution integral calculation, or the like on signal values. For example, a correlation value r from the product-sum operation is defined by the following Equation (1).

$$r = \sum_{k=0}^{CP-1} [x_k^* \cdot y_k] \quad (1)$$

In Equation (1), CP denotes the number of sampled signals input to the correlation calculator 43 during a one-CP time when a time required to receive a single CP signal is defined as the "one-CP time". Also, $x_k$ and $y_k$ denote sampled signals input to the correlation calculator 43 separated from each other by one-symbol time intervals when a time required to receive a DL signal of one symbol is defined as a "one-symbol time". Also, the one-CP time or the one-symbol time are predetermined in accordance with a target communication protocol. For example, in 3GPP TS 36.211, the one-CP time is set to several microseconds to tens of microseconds and the one-symbol time is set to tens of microseconds. The correlation calculator 43 outputs a correlation value signal indicating the correlation value calculated as described above to the switching timing detector 345.

Figure 6:
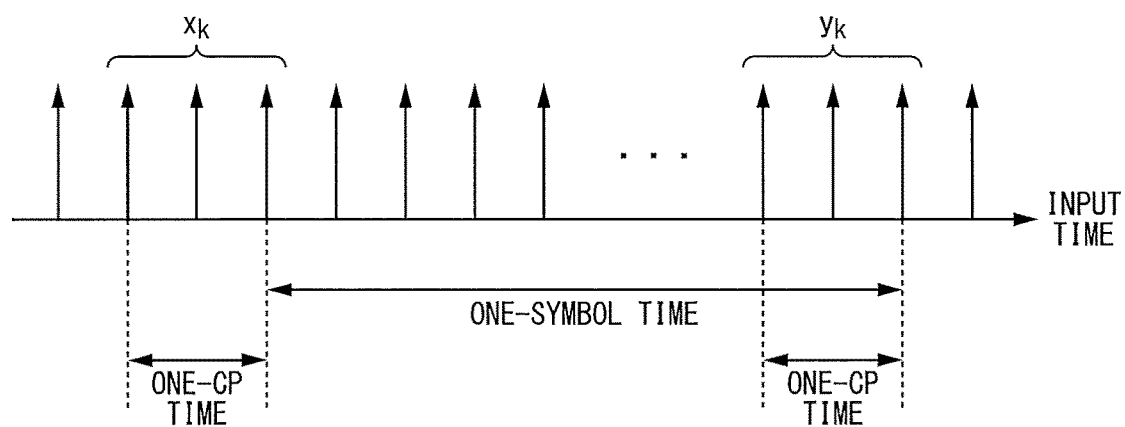
FIG. 6 is a diagram illustrating a specific example of a correlation value calculated by a correlation calculator 43 according to the first embodiment.

FIG. 6 is a diagram illustrating a specific example of the correlation value calculated by the correlation calculator 43 according to the first embodiment. The horizontal axis of FIG. 6 represents times at which the correlation calculator 43 inputs sampled signals in time series and an arrow extending upward from the horizontal axis represents an input of the sampled signal at each time. $x_k$ and $y_k$ represent sampled signals of a one-CP time. That is, FIG. 6 illustrates that $y_k$ is input a one symbol time after $x_k$ is input to the correlation calculator 43. Equation (1) is an equation for calculating a correlation between the sampled signals $x_k$ and $y_k$ input at one-symbol time intervals as described above. As described above, the CP signal is a signal added as a guard time to the beginning of a symbol, and is generally the same signal as a signal of a prescribed size positioned at the end of the symbol. Thus, the above-described correlation value has a maximum value after a one-symbol time from a point in time at which the input of a certain CP signal has started. In other words, by detecting such a maximum value of the correlation value (hereinafter referred to as a "maximum correlation value"), after about the one-symbol time from the input of a certain CP signal, the input of a symbol following the CP signal can be detected.

Figure 7:
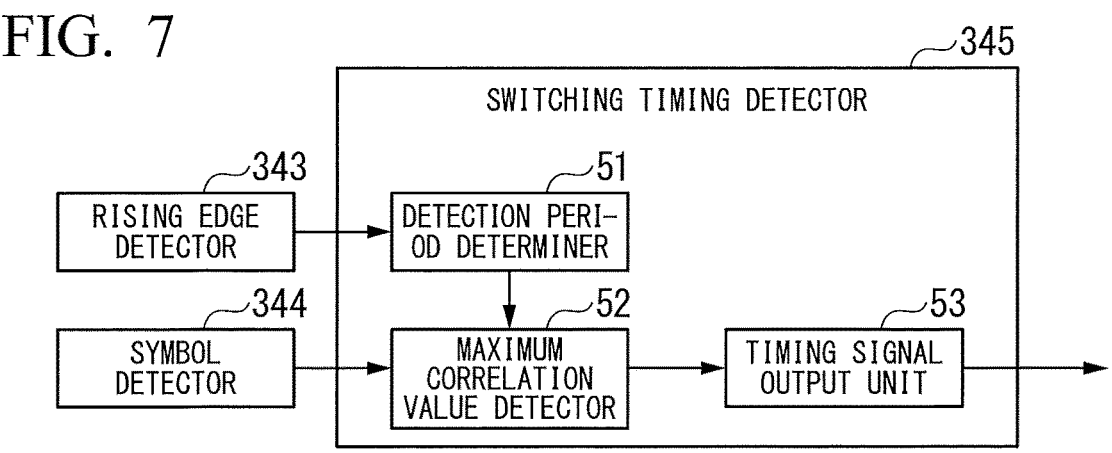
FIG. 7 is a diagram illustrating a specific example of a functional configuration of a switching timing detector 345 according to the first embodiment.

FIG. 7 is a diagram illustrating a specific example of the functional configuration of the switching timing detector 345 according to the first embodiment. The switching timing detector 345 includes a detection period determiner 51, a maximum correlation value detector 52, and a timing signal output unit 53.

The detection period determiner 51 determines an execution timing of a process of detecting the maximum correlation value (hereinafter referred to as a "maximum value detection process") on the basis of a rising edge detection signal output from the rising edge detector 343 and sequentially input correlation value signals. Specifically, the detection period determiner 51 determines a reference time for determining the execution timing and a time width for that time. Hereinafter, a period representing the execution timing is referred to as a "detection period". In order to improve the reliability of the correlation value signal to be processed, the detection period determiner 51 may have a statistical processing function of executing a moving average process or an abnormal value exclusion process on the correlation value signal, and the like.

The maximum correlation value detector 52 executes a maximum value detection process during the detection period determined by the detection period determiner 51. By executing the maximum value detection process, the maximum correlation value detector 52 detects a correlation value signal indicating the maximum correlation value among correlation value signals sequentially input within the detection period. At a timing when the correlation value signal indicating the maximum correlation value has been detected, the maximum correlation value detector 52 outputs a detection notification to the timing signal output unit 53.

Basically, a case in which correlation values indicated by correlation value signals sequentially input within the detection period monotonously increase or monotonously decrease after a monotonous increase is conceived. In this case, it is only necessary for the maximum correlation value detector 52 to provide a notification to the timing signal output unit 53 at a timing when the correlation value has the maximum value. However, if the correlation value repeatedly increases/decreases within the detection period, the maximum correlation value detector 52 may be configured to provide a notification to the timing signal output unit 53 at an initial timing when the correlation value exceeds a prescribed threshold value.

In accordance with the notification from the maximum correlation value detector 52, the timing signal output unit 53 outputs a timing signal to the switching unit 346. For example, the timing signal output unit 53 outputs a pulse signal indicating a switching timing. Also, for example, the timing signal output unit 53 may output a timing signal indicating the switching timing by the number of clocks corresponding to an elapsed time from the timing at which the rising edge of the received signal has been detected.

Figure 8A:
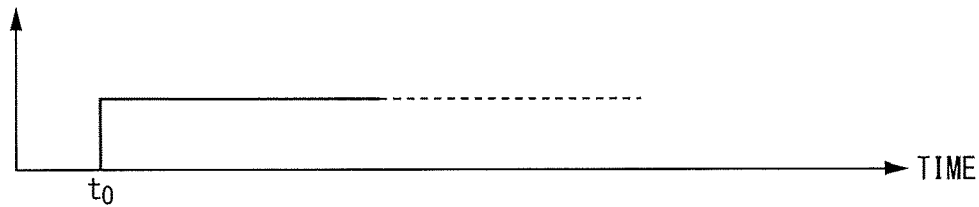
FIG. 8A is a diagram illustrating a specific example of a detection period determined according to the first embodiment.
Figure 8B:
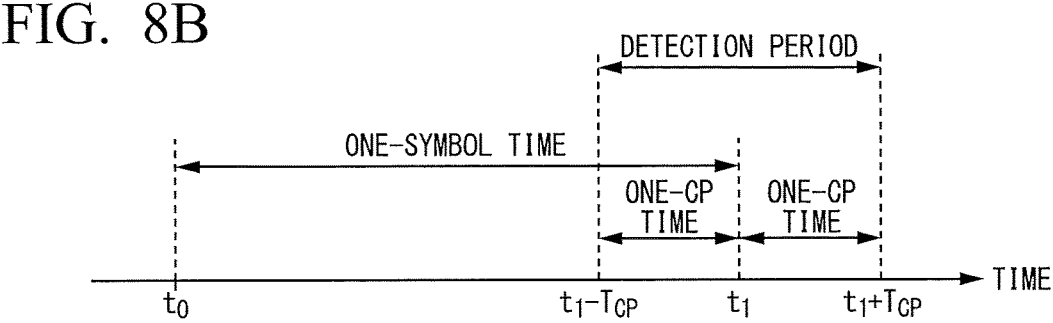
FIG. 8B is a diagram illustrating a specific example of a detection period determined according to the first embodiment.
Figure 8C:
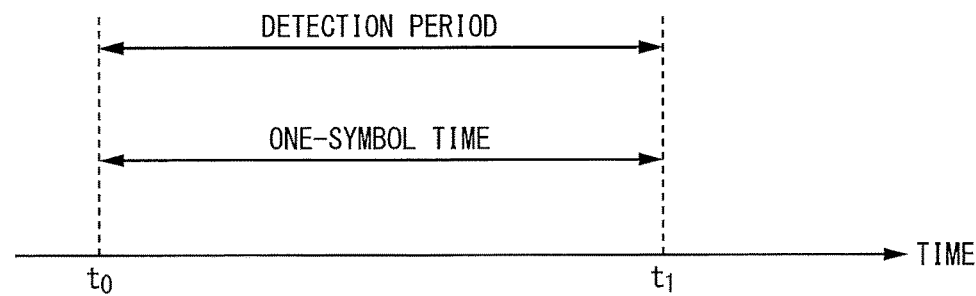
FIG. 8C is a diagram illustrating a specific example of a detection period determined according to the first embodiment.

FIGS. 8A, 8B and 8C is a diagram illustrating a specific example of the detection period determined in the first embodiment. FIG. 8A illustrates a specific example of the rising edge detection signal output by the rising edge detector 343. FIGS. 8B and 8C illustrate specific examples of the detection period to be determined. FIG. 8A illustrates that an input of a DL signal is detected at time $t_0$.

FIG. 8B illustrates an example in which the detection period is determined to be a period represented by two CP periods before and after time $t_1$ when a one-symbol time has elapsed from time $t_0$. That is, assuming that a one-CP time is $T_{CP}$, a period from time $t_1-T_{CP}$ to time $t_1+T_{CP}$ is determined to be a detection period in the example of FIG. 8B. As described above, although the maximum correlation value is theoretically detected after a one-symbol time from a point in time at which the input of the CP signal has started, an error may also occur at the detection timing of the maximum correlation value because there is variation in the actual rising edge of the input signal. Thus, it is possible to more reliably detect the input of the symbol by having a width as illustrated in FIG. 8B during the detection period.

Also, a time width of the detection period based on time $t_1$ is not necessarily required to be a two-CP time. For example, the time width of the detection period may be determined to be a one-CP time before and after time $t_1$. Also, time $t_1$ is not necessarily a center of the detection period. Also, the time width of the detection period may be determined to be a one-CP time before time $t_1$ or may be determined to be a one-CP time after time $t_1$.

FIG. 8C illustrates an example in which the detection period is determined to be a one-symbol period after time $t_1$ when the input of the DL signal has started. In the present example, the switching timing detector 345 continues to execute the maximum value detection process during a one-symbol time from the input of a certain CP signal to the input of the next CP signal. Thus, in this case, the calculation cost increases but it is possible to more reliably detect the switching timing. Also, in this case, it is also possible to more reliably detect the switching timing by setting a time width of the detection period slightly longer than a one-symbol time.

Figure 9:
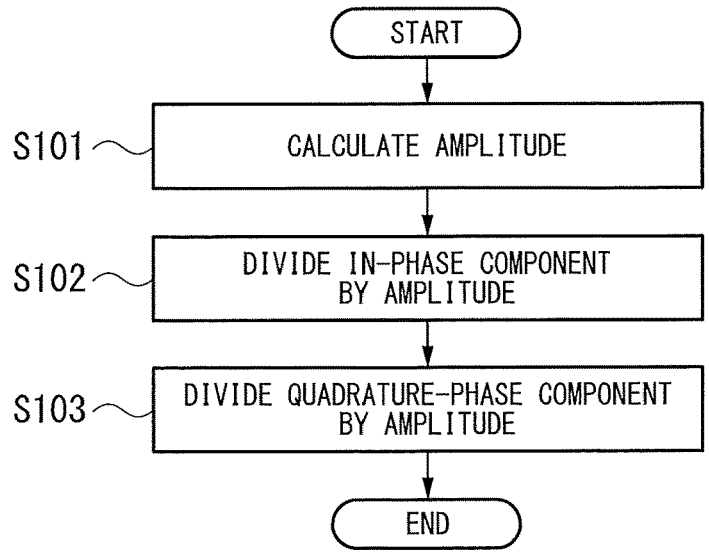
FIG. 9 is a flowchart illustrating a flow of a process in which a normalizer 41 normalizes a DL signal according to the first embodiment.

FIG. 9 is a flowchart illustrating a flow of a process in which the normalizer 41 normalizes a DL signal according to the first embodiment. First, the normalizer 41 acquires an amplitude value of an input DL signal (digital signal) (step S101). For example, the amplitude value is acquired by calculating a square root of the sum of squares of an in-phase component value (hereinafter referred to as an "I value") and a quadrature-phase component value (hereinafter referred to as a "Q value") of the DL signal (an OFDM signal). The normalizer 41 divides the I value of the DL signal by the amplitude value (step S102) and divides the Q value of the DL signal by the amplitude value (step S103). The normalizer 41 outputs a signal indicating each division value as a normalized signal.

Figure 10:
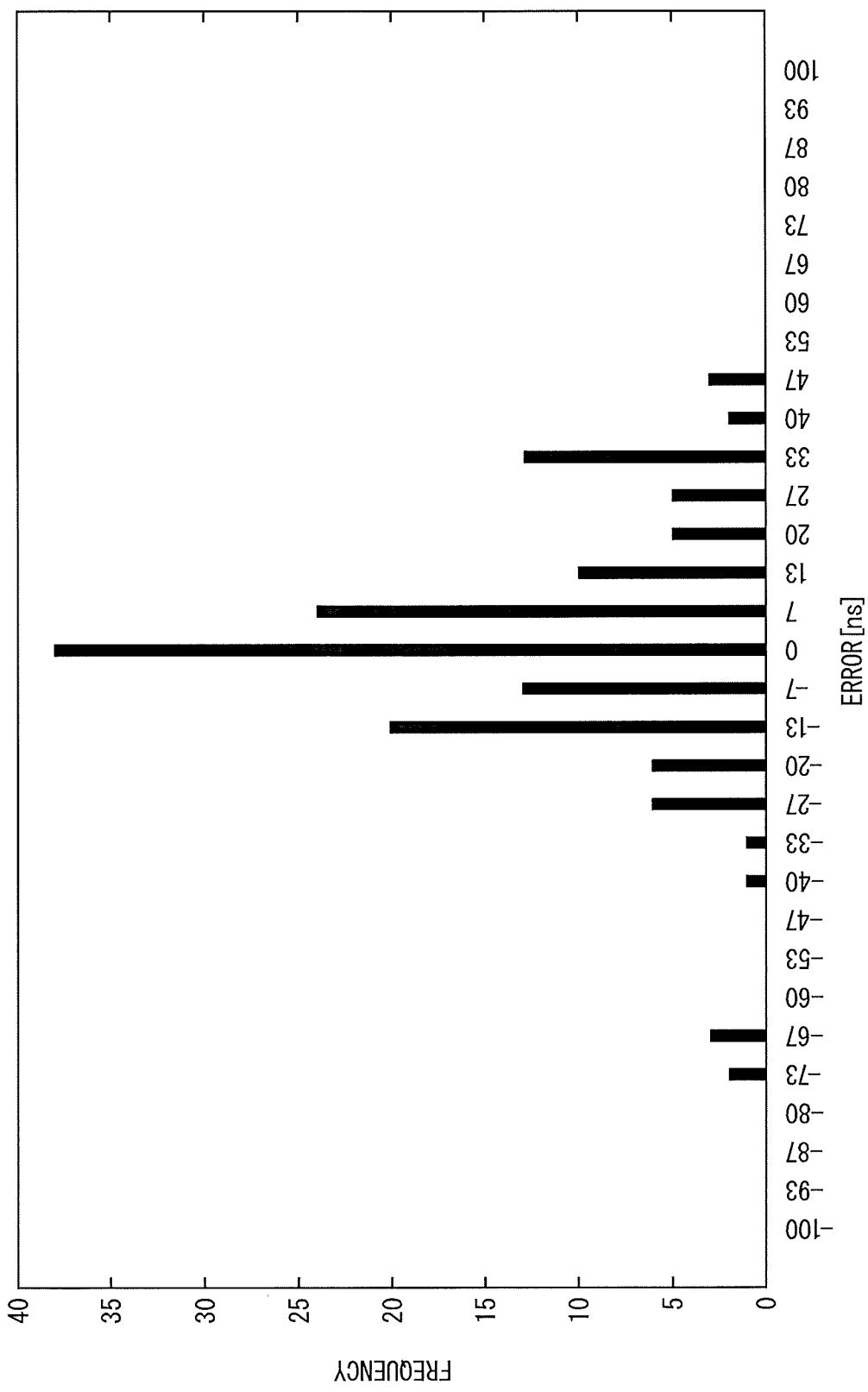
FIG. 10 is a diagram illustrating an example of a result of detecting a timing at which the switching timing detector 345 switches UL signal transmission to DL signal transmission according to the first embodiment.

FIG. 10 is a diagram illustrating an example of a result of detecting a timing at which the switching timing detector 345 switches the UL signal transmission to the DL signal transmission according to the first embodiment. If the DL signal transmission and the UL signal transmission are switched at intervals defined by 3GPP TS 36.211 (one-millisecond intervals), the horizontal axis represents a magnitude of an error between a switching timing detected by the switching timing detector 345 and an actual switching timing. The vertical axis represents a frequency of a detection result corresponding to each error represented by the horizontal axis. Also, in FIG. 10, a negative value error indicates that the switching timing is detected at a timing earlier than the actual switching timing. This is because, as described above, a timing at which the maximum correlation value of the CP signal is detected is after a one-symbol time from a point in time at which the input of the CP signal has started and there is a possibility that the maximum correlation value will be detected before the one-symbol time elapses due to an influence of noise of a signal or the like. As a result, according to the first embodiment, the switching timing detector 345 can detect a switching timing with an error of about 21 nanoseconds in a standard deviation with respect to switching at one-millisecond intervals. According to this detection result, the slave station apparatus 3 according to the first embodiment can also transmit a signal with a short guard time without affecting communication quality.

Conventionally, although it is possible to detect the switching timing with high accuracy by demodulating an LTE symbol and detecting a radio frame, the configuration of the slave station apparatus 3 becomes complicated and high manufacturing cost is required. Also, conventionally, although it is possible to detect the switching timing without demodulating a symbol by performing convolution integration on a symbol signal, the switching timing may be erroneously detected if a signal with large amplitude variation is transmitted as in a portable phone.

On the other hand, in the distributed antenna system 100 of the first embodiment, the slave station apparatus 3 detects a timing at which the UL signal transmission is switched to the DL signal transmission on the basis of a correlation between DL signals input at one-symbol time intervals. Such a switching timing detection method can be implemented in a simple process such as signal normalization and a product-sum operation. According to the distributed antenna system 100 of the first embodiment having such a configuration, it is possible to switch UL signal transmission to DL signal transmission with high accuracy without complicating the configuration of the slave station apparatus 3.

Second Embodiment

Figures 11, 12:
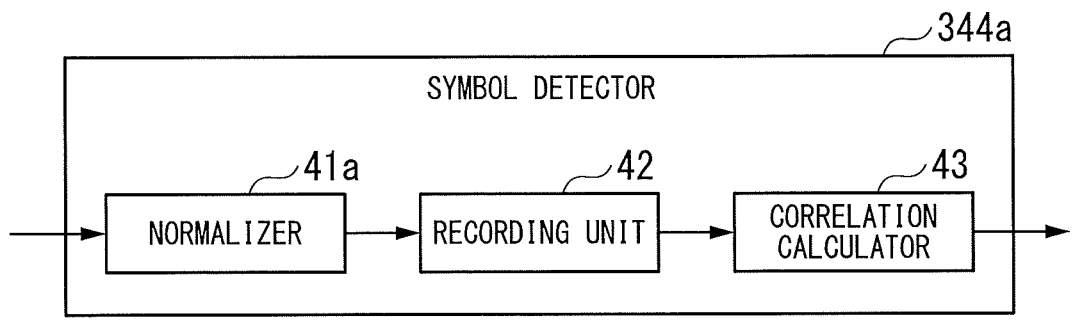
FIG. 11 is a diagram illustrating a specific example of a functional configuration of a symbol defector 344*a* according to a second embodiment.
FIG. 12 is a diagram illustrating a first specific example of correspondence information according to the second embodiment.

FIG. 11 is a block diagram illustrating a specific example of a functional configuration of a symbol detector 344a according to a second embodiment. A distributed antenna system 100 of the second embodiment is different from the distributed antenna system 100 of the first embodiment in that a slave station apparatus 3 includes the symbol detector 344a instead of the symbol detector 344. The symbol detector 344a is different from the symbol detector 344 according to the first embodiment in that a normalizer 41a is provided instead of the normalizer 41. The other configuration is similar to that of the distributed antenna system 100 of the first embodiment.

The normalizer 41a includes a storage apparatus such as a magnetic hard disk apparatus or a semiconductor storage apparatus and pre-stores information indicating a correspondence relationship between a value of a sampled signal and a value of a normalized signal obtained by normalizing the sampled signal (hereinafter referred to as "correspondence information") in the storage apparatus. The normalizer 41a generates a normalized signal corresponding to an input sampled signal on the basis of the correspondence information and records the generated normalized signal in the storage apparatus.

FIG. 12 is a diagram illustrating a first specific example of the correspondence information according to the second embodiment. For example, the correspondence information is stored in the storage apparatus as a correspondence information table T1 illustrated in FIG. 12. The correspondence information table T1 has first correspondence information record for each combination of I and Q values of a sampled signal. The first correspondence information record has I and Q values of a sampled signal and I and Q values of a normalized signal corresponding thereto. For each combination of I and Q values that the sampled signal can have, I and Q values of the normalized signal can be calculated in a method similar to that of the normalizer 41 according to the first embodiment and pre-registered in the correspondence information table T1. In this case, for example, if a sampled signal having an I value of "1" and a Q value of "2" has been input, the normalizer 41a generates a normalized signal in which an I value is "0.447" and a Q value is "0.894" and records the generated normalized signal in the storage apparatus.

Also, in the correspondence information table T1, correspondence information records corresponding to all combinations of I and Q values that the sampled signal can have may not be registered. In this case, if there is no record corresponding to the input sampled signal, the normalizer 41a may generate a normalized signal on the basis of a record having a value of a sampled signal closest thereto.

Figures 13, 14:
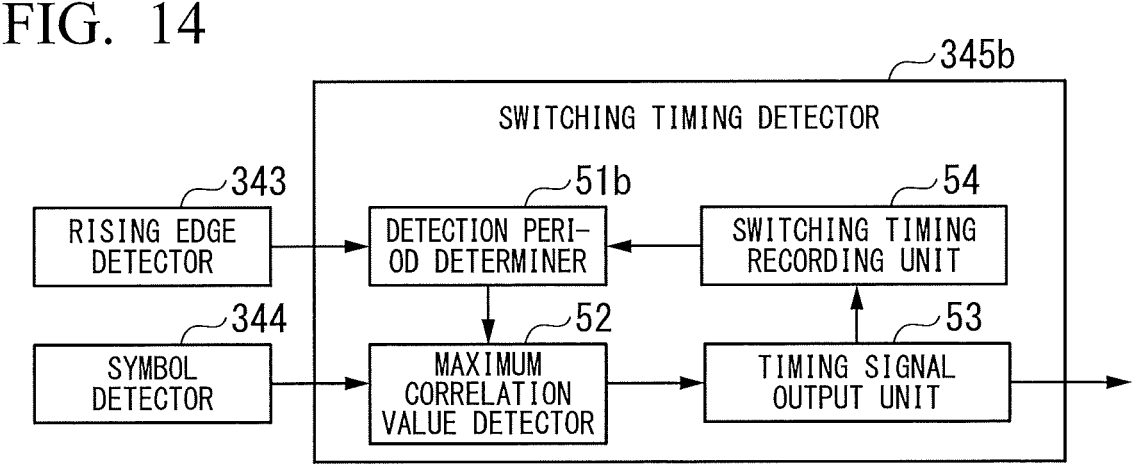
FIG. 13 is a diagram illustrating a second specific example of the correspondence information according to the second embodiment.
FIG. 14 is a diagram illustrating a specific example of a functional configuration of a switching timing detector 345b according to a third embodiment.

FIG. 13 is a diagram illustrating a second specific example of the correspondence information according to the second embodiment. For example, the correspondence information is stored in the storage apparatus as correspondence information table T2 illustrated in FIG. 13. The correspondence information table T2 has a second correspondence information record for each piece of phase information of a sampled signal. The second correspondence information record has phase information of the sampled signal and I and Q values of a normalized signal corresponding thereto. The phase information of the sampled signal represents a phase (0 to $\pi$) formed by I and Q values on a complex plane. For example, the phase information is obtained by dividing the Q value by the I value. Also, for example, the phase information may be obtained through a recursive process such as a coordinate rotation digital computer (CORDIC) algorithm.

The phase information is calculated for each combination of I and Q values that the sampled signal can have and pre-registered in the correspondence information table T2. Also, for each combination of I and Q values that the sampled signal can have, I and Q values of the normalized signal are calculated in a method similar to that of the normalizer 41 according to the first embodiment and pre-registered in the correspondence information table T2. In this case, the normalizer 41a calculates a phase on the basis of I and Q values of an input sampled signal and acquires I and Q values of a normalized signal corresponding to the calculated phase from the correspondence information table T2. For example, if a sampled signal having a phase information value of "2.000" has been input, the normalizer 41a generates a normalized signal having an I value of "0.894" and a Q value of "0.447" and records the generated normalized signal in the storage apparatus.

Also, in the correspondence information table T2, correspondence information records corresponding to all phases that the sampled signal can have may not be registered. In this case, if there is no record corresponding to a phase of an input sampled signal, the normalizer 41a may generate a normalized signal on the basis of a record having a phase value closest thereto.

In this manner, the first correspondence information record holds four values of the I and Q values of the sampled signal and the I and Q values of the normalized signal, whereas the second correspondence information record holds three values of the phase information of the sampled signal and the I and Q values of the normalized signal. Thus, if the correspondence information is held in the form of the correspondence information table T2, the cost of calculating the phase of the sampled signal increases but a storage area of the correspondence information can be reduced.

In the distributed antenna system 100 of the second embodiment configured as described above, the slave station apparatus 3 generates a normalized signal on the basis of pre-stored correspondence information. Thereby, the slave station apparatus 3 can reduce the load of calculating the normalized signal from the sampled signal.

Specifically, the slave station apparatus 3 pre-stores correspondence information shown in the first specific example and therefore the normalizer 41a can generate a normalized signal by merely retrieving the correspondence information table T1 on the basis of a value of an input sampled signal. Also, the slave station apparatus 3 pre-stores correspondence information shown in the second specific example and therefore the normalizer 41a can calculate a phase of the input sampled signal and generate a normalized signal by merely retrieving the correspondence information table T2 on the basis of the calculated phase.

Third Embodiment

FIG. 14 is a block diagram illustrating a specific example of a functional configuration of a switching timing detector 345b according to a third embodiment. A distributed antenna system 100 of the third embodiment is different from the distributed antenna system 100 of the first embodiment in that a slave station apparatus 3 includes the switching timing detector 345b instead of the switching timing detector 345. Also, the switching timing detector 345b is different from the switching timing detector 345 according to the first embodiment in that the switching timing detector 345b further includes a detection period determiner 51b instead of the detection period determiner 51, and further includes a switching timing recording unit 54. The other configuration is similar to that of the distributed antenna system 100 of the first embodiment.

The switching timing recording unit 54 includes a storage apparatus such as a magnetic hard disk device or a semiconductor storage apparatus and records information indicating a timing at which a timing signal output unit 53 outputs a timing signal (hereinafter referred to as "timing information"). For example, if the timing signal is output as a pulse signal, information in which an output pulse signal and a time axis are associated is recorded as timing information.

The detection period determiner 51b determines a detection period on the basis of a rising edge detection signal output from a rising edge detector 343, correlation value signals sequentially input from the symbol detector 344, and timing information recorded in the switching timing recording unit 54. If timing information indicating a previous switching timing is not recorded in the switching timing recording unit 54, the detection period determiner 51b determines the detection period in a method similar to that of the detection period determiner 51 according to the first embodiment.

On the other hand, if timing information indicating the previous switching timing is recorded in the switching timing recording unit 54, the detection period determiner 51b determines the detection period on the basis of the previous switching timing indicated by the timing information.

Figure 15A:
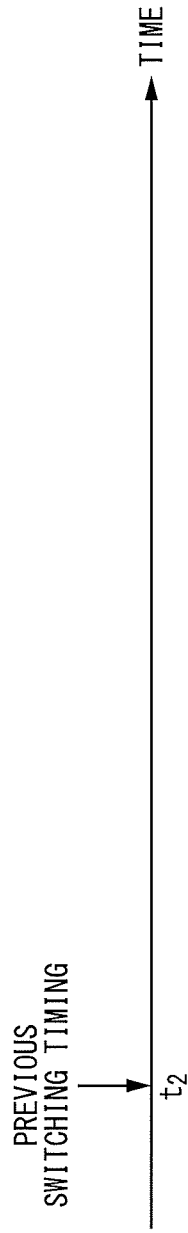
FIG. 15A is a diagram illustrating a specific example of a method in which the detection period determiner 51b determines a detection period on the basis of a previous switching timing according to the third embodiment.
Figure 15B:
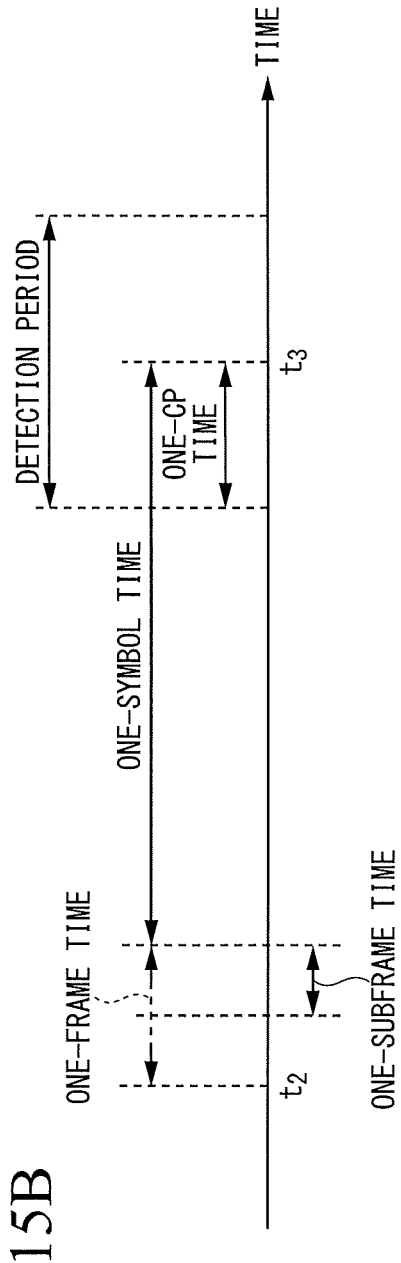
FIG. 15B is a diagram illustrating a specific example of a method in which the detection period determiner 51b determines a detection period on the basis of a previous switching timing according to the third embodiment.

FIGS. 15A and 15B is a diagram illustrating a specific example of a method in which the detection period determiner 51b determines a detection period on the basis of a previous switching timing according to the third embodiment. FIG. 15A illustrates a previous switching timing indicated by timing information. FIG. 15B illustrates a specific example of the detection period to be determined. FIG. 15A illustrates that the previous switching timing is time $t_2$. FIG. 15B illustrates an example in which the detection period is determined to be a period represented by a two-CP period before and after time $t_3$ at which a total time of a one-frame time and a one-symbol time has elapsed from time $t_2$. Here, the one-frame time is a time required to receive a signal of one frame, and is defined as 10 msec in 3GPPTS 36.211. The one-frame time is shortly shown for simplicity in FIGS. 15A and 15B.

Also, in 3GPPTS 36.211, switching between DL signal transmission and UL signal transmission is performed every one slot time. The one-slot time is a time required to receive a signal of one slot (one twentieth of one frame). Thus, an example in which the UL signal transmission is switched to the DL signal transmission and an input of a DL signal is started after the elapse of a one-frame time from a timing at which the DL signal transmission has started is conceived. Therefore, if the previous switching timing is recorded, it is possible to determine the detection period on the basis of the previous switching timing without using a rising edge detection signal.

In the distributed antenna system 100 of the third embodiment configured as described above, the slave station apparatus 3 can reduce a detection error of a switching timing due to variation in a rising edge of an input signal by determining the detection period on the basis of the previous switching timing.

Also, the detection period determiner 51b may determine a detection period based on a time at which a total time of a one-subframe time and a one-symbol time has elapsed from the previous switching timing. Here, the one-subframe time is a time required to receive a signal of one subframe and is defined as one tenth of the one-frame time in 3GPP TS 36.211. Thus, an example in which the UL signal transmission is switched to the DL signal transmission and the input of the DL signal is started even when a one-subframe time has elapsed from a timing at which the DL signal transmission has stalled is conceived.

Fourth Embodiment

Figure 16:
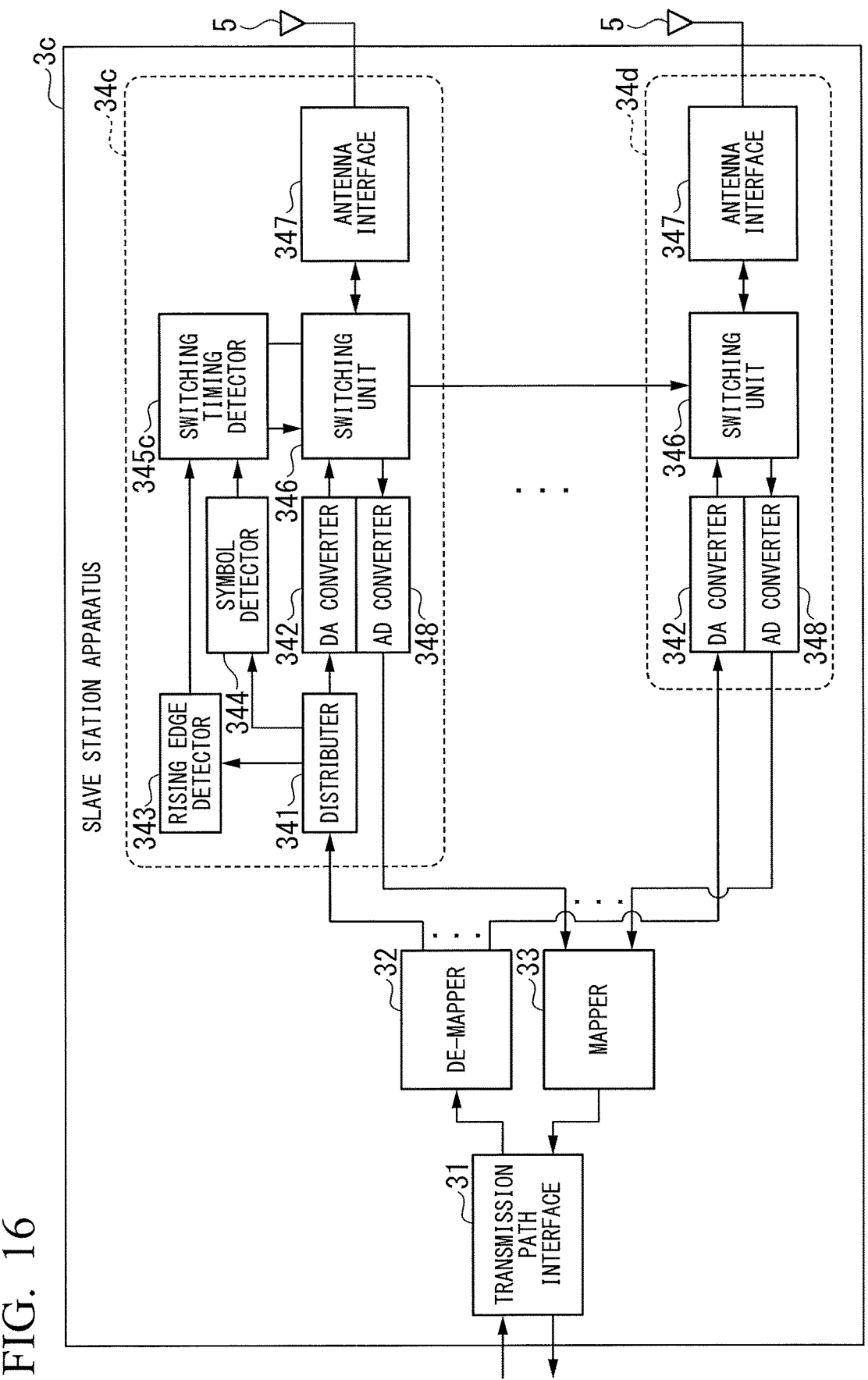
FIG. 16 is a diagram illustrating a specific example of a functional configuration of a slave station apparatus 3c according to a fourth embodiment.

FIG. 16 is a diagram illustrating a specific example of a functional configuration of a slave station apparatus 3c according to a fourth embodiment. The slave station apparatus 3c is different from the slave station apparatus 3 according to the first embodiment in that one of one or more transmission units 34 includes a rising edge detector 343, a symbol detector 344, and a switching timing detector 345c. Here, the transmission unit 34 including the rising edge detector 343, the symbol detector 344, and the switching timing detector 345c is referred to as a first transmission unit 34c, and another transmission unit 34 is referred to as a second transmission unit 34d for distinction.

The first transmission unit 34c is different from the transmission unit 34 according to the first embodiment in that the switching timing detector 345c is provided instead of the switching timing detector 345. Also, the second transmission unit 34d is different from the transmission unit 34 according to the first embodiment in that the second transmission unit 34d does not include the distributer 341, the rising edge detector 343, the symbol detector 344, and the switching timing detector 345.

The switching timing detector 345c detects a switching timing in a method similar to that of the first embodiment and outputs a timing signal to all switching units 346 of the first transmission unit 34c and the second transmission unit 34d. All the switching units 346 of the first transmission unit 34c and the second transmission unit 34d switch their transmission operations from the UL signal transmission to the DL signal transmission on the basis of the timing signal output from the switching timing detector 345c.

In the distributed antenna system 100 of the fourth embodiment configured as described above, the slave station apparatus 3c includes the switching timing detector 345c provided in one of one or more transmission units and the switching timing detector 345c notifies all the transmission units provided in the slave station apparatus 3c of a switching timing. Thus, according to the slave station apparatus 3c according to the fourth embodiment, it is possible to reduce a circuit scale as compared with the slave station apparatus 3 according to the first embodiment. Such a configuration is particularly effective for a slave station apparatus that transmits a signal in a multiple input multiple output (MIMO) scheme.

Fifth Embodiment

Figure 17:
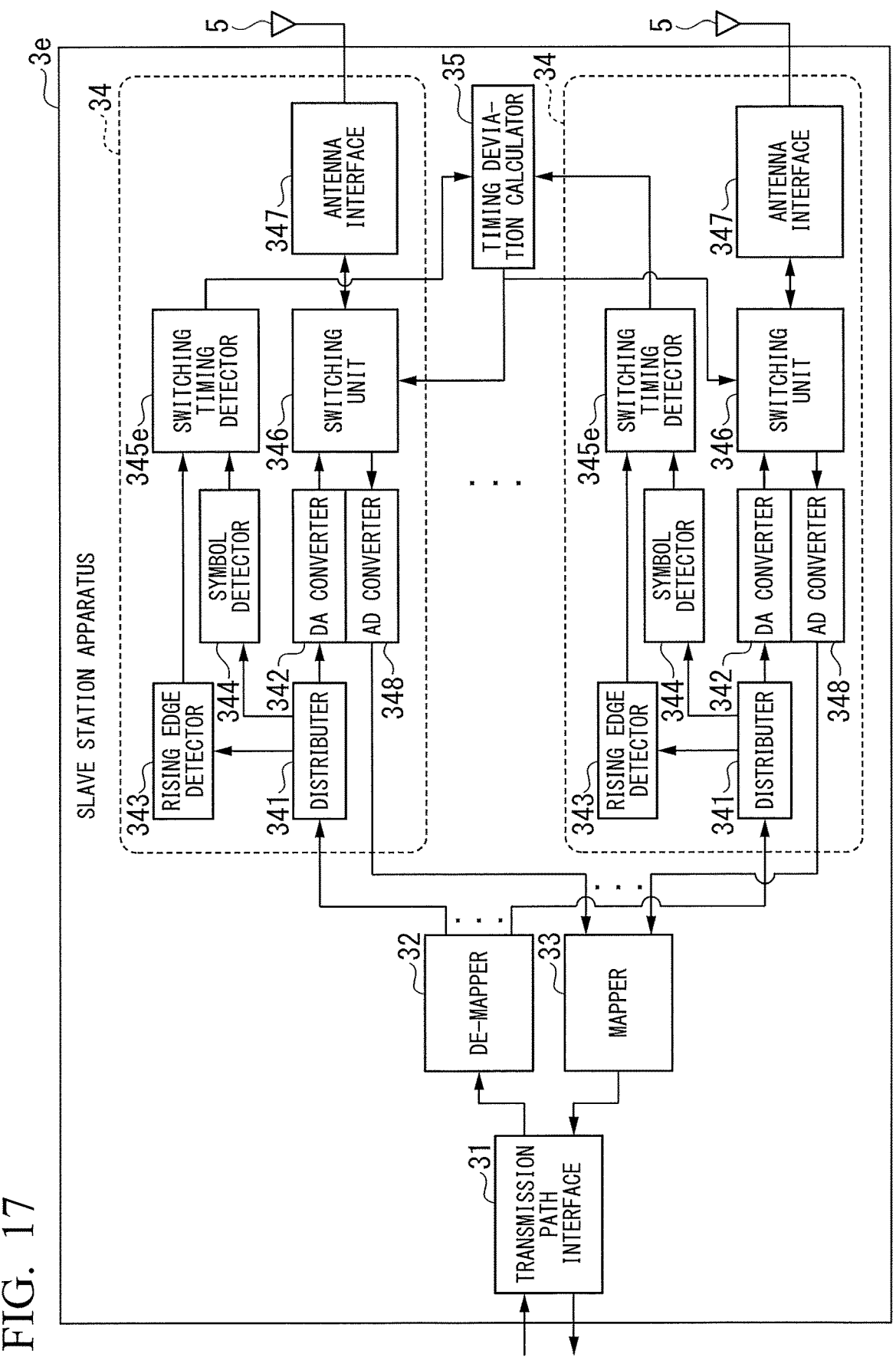
FIG. 17 is a diagram illustrating a specific example of a functional configuration of a slave station apparatus 3e according to a fifth embodiment.

FIG. 17 is a diagram illustrating a specific example of a functional configuration of a slave station apparatus 3e according to a fifth embodiment. The slave station apparatus 3c is different from the slave station apparatus 3 according to the first embodiment in that slave station apparatus 3e further includes a switching liming detector 345e instead of the switching liming detector 345 and further includes a timing deviation detector 35.

The switching timing detector 345e is different from the switching timing detector 345 according to the first embodiment in that the switching timing detector 345 according to the first embodiment outputs a timing signal to the switching unit 346 of the same transmission unit 34 and the switching timing detector 345e outputs a timing signal to the timing deviation detector 35.

The timing deviation detector 35 detects a deviation of each timing signal on the basis of a timing signal output from the switching timing detector 345e of each transmission unit 34. For example, the timing deviation detector 35 detects a difference between an earliest switching timing and a latest switching timing among switching timings indicated by timing signals. If a magnitude of the detected deviation of the switching timing is less than or equal to a threshold value, the timing deviation detector 35 outputs each timing signal to the corresponding switching unit 346. On the other hand, if the magnitude of the detected deviation of the switching timing exceeds the threshold value, the timing deviation detector 35 determines that some abnormality has occurred and performs a predetermined prescribed operation.

For example, if it is determined that an abnormality has occurred, the timing deviation detector 35 provides a notification indicating the occurrence of the abnormality. This notification may be an output of speech, display of information on a display device, or mail transmission addressed to a system administrator. Also, for example, if it is determined that an abnormality has occurred, the timing deviation detector 35 may cause the transmission/reception of a radio signal by an antenna 5 to be stopped. Also, for example, the timing deviation detector 35 may be configured to correct and output some or all of the timing signals so that the magnitude of the deviation of the timing signal is less than or equal to the threshold value.

In a distributed antenna system 100 of the fifth embodiment configured as described above, the slave station apparatus 3e includes a timing deviation detector 35 configured to calculate a deviation of the switching timing detected by each transmission unit and perform a prescribed operation according to a magnitude of the deviation. According to the distributed antenna system 100 of the fifth embodiment configured as described above, a distributed antenna system that operates more stably can be implemented. Such a configuration is particularly effective for a distributed antenna system accommodating a plurality of communication carriers.

Hereinafter, modified examples of the distributed antenna system 100 of the above-described embodiments will be described.

Although the example of the distributed antenna system 100 when the slave station apparatus 3 detects switching between the DL signal and the UL signal has been described in the above-described embodiments, a function of detecting the switching between the DL signal and the UL signal in the slave station apparatus 3 may be optionally provided. In general, the master station apparatus 1 is different from the slave station apparatus 3 in that the master station apparatus 1 includes a transmission path interface of a first transmission path 61 instead of the transmission path interface 21 of the third transmission path 63 and includes a transmission path interface of a second transmission path 62 instead of the antenna interface 347. Also, the hub station apparatus 4 is different from the slave station apparatus 3 in that the hub station apparatus 4 includes a transmission path interface of the second transmission path 61 instead of the transmission path interface 21 of the third transmission path and includes a transmission path interface of the third transmission path instead of the antenna interface 347. Because the other configurations of the master station apparatus 1 and the hub station apparatus 4 are similar to those of the slave station apparatus 3, for example, the function of detecting the switching between the DL signal and the UL signal may be provided in the master station apparatus 1 or the hub station apparatus 4.

Also, if the slave station apparatus 3 inputs an analog signal from the transmission path interface 31, the rising edge detector 343 may be configured using an analog detector.

Also, although a method of detecting a CP signal in OFDM on the basis of a correlation value between consecutively input signals has been described as an example of a method of detecting an input start of a DL signal in the above-described embodiments, it is also possible to detect an input start of a DL signal in a similar method in any other communication scheme for arranging the same signal before and after a frame.

According to at least one embodiment described above, there are provided the rising edge detector 343 configured to detect a rising edge of a received signal, the symbol detector 344 configured to detect a symbol of a signal indicating a guard time in a time division multiplexing scheme from the received signal, and the switching timing detector 345 configured to detect a switching timing of the transmission operation on the basis of detection results of the rising edge detector 343 and the symbol detector 344, whereby switching between the UL signal and the DL signal to be transmitted in the time division multiplexing scheme can be detected with a simpler configuration and with higher accuracy.

Also, the recording unit 42 according to the above-described embodiment is an example of a sampling unit. Also, the transmission path interface 31 and the de-mapper 32 are examples of a reception unit. Also, the user terminal is an example of a terminal station apparatus.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication apparatus, comprising:
   a switching unit configured to switch a transmission operation of a signal in the communication apparatus between uplink signal transmission and downlink signal transmission;
   a reception unit configured to receive a signal transmitted in a time division multiplexing scheme;
   a rising edge detector configured to detect a rising edge of a received signal received by the reception unit;
   a symbol detector configured to detect a symbol of a signal indicating a guard time in the time division multiplexing scheme from the received signal; and
   a switching timing detector configured to detect a switching timing of the transmission operation from the switching unit on the basis of detection results of the rising edge detector and the symbol detector.

2. The communication apparatus according to claim 1, wherein the rising edge detector has a function of measuring reception power of the received signal and detects a rising edge of the reception power.

3. The communication apparatus according to claim 1, wherein the symbol detector includes a sampling unit configured to sample the received signal;
a normalizer configured to normalize the received signal sampled by the sampling unit; and
a correlation calculator configured to calculate a correlation value between signals received at prescribed time intervals among received signals normalized by the normalizer, and
wherein the switching timing detector detects the switching timing on the basis of the correlation value.

4. The communication apparatus according to claim 3, wherein the normalizer normalizes the received signal by dividing a signal value of the sampled received signal by amplitude of the received signal.

5. The communication apparatus according to claim 3,
wherein the received signal is an orthogonal frequency division multiplexing (OFDM) signal, and
wherein the normalizer acquires a value after normalization of the sampled received signal on the basis of correspondence information indicating a correspondence relationship between values of an in-phase component and a quadrature-phase component of the OFDM signal and values obtained by normalizing the in-phase component and the quadrature-phase component of the OFDM signal.

6. The communication apparatus according to claim 3,
wherein the received signal is an orthogonal frequency division multiplexing (OFDM) signal, and
wherein the normalizer acquires a value after normalization of the sampled received signal on the basis of correspondence information indicating a correspondence relationship between a phase of the OFDM signal and the values obtained by normalizing an in-phase component and a quadrature-phase component of the OFDM signal.

7. The communication apparatus according to claim 3, wherein the switching timing detector detects a timing at which the correlation value or a value obtained by performing a statistical process on the correlation value becomes a maximum value as the switching timing during a prescribed detection period determined in accordance with a timing at which the rising edge detector has detected the rising edge of the received signal.

8. The communication apparatus according to claim 7, wherein the switching timing detector detects the maximum value during a detection period determined in accordance with a timing at which a one-frame time required to receive a signal of approximately one frame has elapsed from a switching timing detected during a previous detection period.

9. The communication apparatus according to claim 7, wherein the switching timing detector detects the maximum value during a detection period determined in accordance with a timing at which a one-subframe time required to receive a signal of approximately one subframe has elapsed from a switching timing detected during a previous detection period.

10. The communication apparatus according to claim 1, further comprising:
   a plurality of antennas,
   wherein the switching timing detector notifies all switching units provided for every two or more antennas of a switching timing detected in relation to any of the plurality of antennas, and
   wherein all the switching units switch transmission operations at the same switching timing of which the switching timing detector is notified.

11. The communication apparatus according to claim 1, further comprising:
a plurality of antennas,
wherein the switching timing detector detects the switching timing in relation to each antenna of the plurality of antennas,
wherein the communication apparatus further comprises a timing deviation calculator configured to calculate a deviation of the switching timing detected in relation to each antenna, and
wherein the timing deviation calculator provides a notification of a magnitude of the calculated deviation of the switching timing if the magnitude exceeds a prescribed threshold value.

12. The communication apparatus according to claim 1, further comprising:
a plurality of antennas,
wherein the switching timing detector detects the switching timing in relation to each antenna of the plurality of antennas,
wherein the communication apparatus further comprises a timing deviation calculator configured to calculate a deviation of the switching timing detected in relation to each antenna, and
wherein the timing deviation calculator causes transmission of a signal in the communication apparatus to be stopped if a magnitude of the calculated deviation of the switching timing exceeds a prescribed threshold value.

13. The communication apparatus according to claim 1, further comprising:
a plurality of antennas,
wherein the switching timing detector detects the switching timing in relation to each antenna of the plurality of antennas,
wherein the communication apparatus further comprises a timing deviation calculator configured to calculate a deviation of a switching timing detected in relation to each antenna, and
wherein, if a magnitude of the calculated deviation of the switching timing exceeds a prescribed threshold value, the timing deviation calculator corrects the switching timing so that the magnitude of the deviation is less than or equal to the threshold value.

14. A distributed antenna system, comprising:
a master station apparatus; and
one or more slave station apparatuses having a wired connection with the master station apparatus,
wherein the master station apparatus is the communication apparatus according to claim 1 and communicates with a base station apparatus, and
wherein each of the one or more slave station apparatuses includes an antenna for communicating with a terminal station apparatus.

15. A distributed antenna system, comprising:
a master station apparatus; and
one or more slave station apparatuses having a wired connection with the master station apparatus,
wherein the master station apparatus communicates with a base station apparatus, and
wherein each of the one or more slave station apparatuses is the communication apparatus according to claim 1 and includes an antenna for communicating with a terminal station apparatus.

16. A distributed antenna system, comprising:
a master station apparatus;
one or more hub station apparatuses having a wired connection with the master station apparatus; and
one or more slave station apparatuses having a wired connection with the hub station apparatuses and configured to communicate with the master station apparatus via the hub station apparatuses,
wherein the master station apparatus communicates with a base station apparatus,
wherein each of the one or more hub station apparatuses is the communication apparatus according to claim 1, and
wherein each of the one or more slave station apparatuses includes an antenna configured to communicate with the base station apparatus.

17. A switching method, comprising:
a switching step of switching a transmission operation of a signal in a communication apparatus between uplink signal transmission and downlink signal transmission;
a reception step of receiving a signal transmitted in a time division multiplexing scheme;
a rising edge detection step of detecting a rising edge of a received signal received in the reception step;
a symbol detection step of detecting a symbol of a signal indicating a guard time in the time division multiplexing scheme from the received signal; and
a switching timing detection step of detecting a switching timing of the transmission operation in the switching step on the basis of detection results of the rising edge detection step and the symbol detection step.

* * * * *